United States Patent [19]
Ikari

[11] Patent Number: 4,770,512
[45] Date of Patent: Sep. 13, 1988

[54] LARGE APERTURE RATIO WIDE-ANGLE PHOTOGRAPHIC LENS SYSTEM

[75] Inventor: Kazuo Ikari, Tokyo, Japan
[73] Assignee: Olympus Optical Co., Ltd., Tokyo, Japan
[21] Appl. No.: 808,638
[22] Filed: Dec. 13, 1985
[30] Foreign Application Priority Data
  Dec. 18, 1984 [JP] Japan ................. 59-265389
[51] Int. Cl.$^4$ .................. G02B 13/18; G02B 13/04; G02B 9/00
[52] U.S. Cl. ........................ 350/432; 350/458; 350/463
[58] Field of Search ............... 350/432, 463, 458, 459, 350/443

[56] References Cited
U.S. PATENT DOCUMENTS

3,864,026  2/1975  Glatzel ................. 350/458
3,992,085 11/1976  Momiyama ......... 350/432
4,310,222  1/1982  Ikemori ............... 350/432
4,666,261  5/1987  Arai ................... 350/432 X
4,668,056  5/1987  Braat et al. ......... 350/432

FOREIGN PATENT DOCUMENTS

3987570  9/1967  Japan ................. 350/463
55-10049  3/1980  Japan ................. 350/463

Primary Examiner—John K. Corbin
Assistant Examiner—Ronald M. Kachmarik
Attorney, Agent, or Firm—Cushman, Darby & Cushman

[57] ABSTRACT

A large aperture ratio wide-angle photographic lens system comprising a first, second and third lens groups in which an aspherical surface is provided to a lens located near a stop and having a comparative low refractive index, the large aperture ratio wide-angle photographic lens system being thereby arranged that aberrations, especially coma flare, are corrected favorably up to the marginal portion and arranged to be compact in size.

11 Claims, 13 Drawing Sheets

LARGE APERTURE RATIO WIDE-ANGLE PHOTOGRAPHIC LENS SYSTEM

BACKGROUND OF THE INVENTION

1. Field of the invention

The present invention relates to a large aperture ratio wide-angle photographic lens system and, more particularly, to a large aperture ratio wide-angle photographic lens system comprising an aspherical surface.

2. Description of the prior art

The lens system desclosed in Japanese published examined patent application No. 10049/80 is known as a wide-angle photographic lens system having a lens configuration which resembles the lens configuration of the lens system according to the present invention. Said known lens system has the field angle of 84° and aperture ratio of F/1.4. However, in said known lens system, the aspherical surface is provided to a lens for which a material with a high refractive index is used and, therfore, it is necessary to form the aspherical surface on a glass material. This means that it is not easy to manufacture the lens and, consequently, the cost becomes high.

SUMMARY OF THE INVENTION

It is, therefore, a primary object of the present invention to provide a large aperture ratio wide-angle photographic lens system with a field angle of 75° and aperture ratio of F/1.4 arranged that aberrations, especially coma flare, are corrected favourably up to the marginal portion by providing an aspherical surface to a lens with a comparatively low refractive index and arranged to be compact in size.

The large aperture ratio wide-angle photographic lens system according to the present invention comprises, in the order from the object side, a first lens group I, a second lens group II and a third lens group III wherein the first lens group I comprises a negative lens component and a positive lens component, the second lens group II comprises a lens component comprising a negative lens element or a positive and negative lens elements and having negative refractive power as a whole, a positive lens component arranged by leaving an airspace in respect to said lens component which has negative refractive power, and a negative lens component, and the third lens group III comprises a negative lens component, a positive lens component arranged as a cemented doublet, which consists of a negative lens element and a positive lens element, and a positive lens component, said large aperture ratio wide-angle photographic lens system being arranged that a stop is located in the second lens group II or between the second lens group II and the third lens group III. Besides, the lens system according to the present invention is arranged that a lens surface near the stop is formed as an aspherical surface and, moreover, arranged to fulfill the conditions (1) through (4) shown below:

$$4.0 < |f_I/f| < 30, f_I < 0 \quad (1)$$

$$1.7 < |f_{In}/f| < 5.0, f_{In} < 0 \quad (2)$$

$$0.5 < f_{IIp}/f < 2.0 \quad (3)$$

$$0.2 < D/f < 0.7 \quad (4)$$

where, reference symbol f represents the focal length of the lens system as a whole, reference symbol $f_I$ represents the total focal length of the first lens group I, reference symbol $f_{In}$ represents the focal length of the negative lens component in the first lens group I, reference symbol $f_{IIp}$ represents the focal length of the positive lens component in the second lens group II, and reference symbol D represents the airspace between the negative lens component arranged on the object side in the second lens group II and the positive lens component in the second lens group II.

The lens system according to the present invention is a wide-angle photographic lens system and, more particularly, a retrofocus-type wide-angle photogrpahic lens system for a single-lens reflex camera of interchangeable lens type and is arranged that spherical aberration, coma, etc., which occur when said type of lens system is arranged to have a large aperture ratio, are corrected favourably by using an aspherical surface at a position near the stop.

A retrofocus-type lens system can be made small in size and, at the same time, arranged to have a long back focal length when the negative power of the front lens group (the first lens group I in case of the lens system according to the present invention) of the lens system is made strong. In that case, however, distortion occurs considerably.

In case of the lens system according to the present invention, spherical aberration, coma, etc. are corrected by using an aspherical surface at a position near the stop as described in the above. However, distortion cannot be corrected by said aspherical surface. Therefore, the lens system according to the present invention is arranged to make distortion to be reduced by arranging that the negative power of the first lens group becomes an adequate value. The condition (1) is established for the above-mentioned purpose. If the value defined by the condition (1) becomes larger than the upper limit thereof, the lens system becomes too large. If the value defined by the condition (1) becomes smaller than the lower limit thereof, distortion occurs considerably and it is impossible to correct it.

The condition (2) is established in order to correct distortion more favourably. The first lens group I of the lens system according to the present invention is arranged to comprise a negative lens component and a positive lens component and is arranged that distortion caused by the negative lens component is corrected by the positive lens component. If the value defined by the condition (2) becomes smaller than the lower limit thereof, said distortion caused by the negative lens component becomes large and it is impossible to correct it. If the value defined by the condition (2) becomes larger than the upper limit thereof, the diameter of the front lens becomes large.

The conditions (3) and (4) are established in order to arrange that correction of aberrations by the aspherical surface becomes more effective. If the value defined by the condition (3) becomes larger than the upper limit thereof, it is impossible to correct spherical aberration to be caused by marginal rays satisfactorily favourably when spherical aberration to be caused by rays of intermediate height is corrected. If the value defined by the condition (3) becomes smaller than the lower limit thereof, it is impossible to correct spherical aberration to be caused by rays of intermediate height.

The condition (4) relates to correction of coma. If the value defined by the condition (4) becomes smaller than the lower limit thereof, it is impossible to correct coma favourably even when the aspherical surface is provided. If the value defined by the condition (4) becomes larger than the upper limit thereof, the lens system becomes large.

Generally, to correct spherical aberration and curvature of field favourably when a retrofocus-type wide-angle lens system is arranged to have a large aperture ratio, it is preferable to arrange that the lenses located in rear of the stop have high refractive indices. However, in case that it is intended to provide an aspherical surface in rear of the stop, it is inconvenient when the lens to provide the aspherical surface (one of lenses in rear of the stop) has a high refractive index because a glass material should then be used for that lens and the cost becomes high when an aspherical surface is formed on a glass lens. In other words, generally, positive lenses are arranged near the stop in most cases and, to correct curvature of field favourably by correcting Petzval's sum favourably as described in the above, refractive indices of those positive lenses should be made high.

The lens system according to the present invention is arranged to have such lens configuration that negative lenses are located near the stop by selecting an adequate lens type. Besides, it is so arranged that a lens with a low refractive index is contained at a position in rear of the stop, said lens is arranged as a plastic lens, and an aspherical surface is provided to said plastic lens so as to thereby obtain a high performance lens system at a low cost. The lens to provide the aspherical surface may be formed by the so-called replica method, i.e., the method to cement an optical plastic material onto a spherical lens made of a glass material, and the plastic portion of said lens may be arranged that the surface thereof on the side opposite to the surface cemented to the glass lens is formed as an aspherical surface.

To correct aberrations favourably by providing an aspherical surface in case of the lens system according to the present invention, it is preferable to arrange that the aspherical surface has a shape concave toward the stop on the optical axis. When the aspherical surface is arranged as above, incident angles of offaxial rays on the aspherical surface become smaller and it is possible to prevent aggravation of offaxial aberrations to be caused by the aspherical surface. If the aspherical surface is made convex toward the stop on the contrary to the above, incident angles of offaxial meridional rays on the aspherical surface become large when it is attempted to correct spherical aberration and coma by the aspherical surface. As a result, aberrations occur considerably and it is impossible to correct them.

Said aspherical surface is expressed by the formula shown below and it is possible to arrange that the coefficient of aspherical surface E of the fourth power in said formula is selected within the range that fulfills the condition shown below.

$$x = \frac{\frac{y^2}{r}}{1 + \sqrt{1 - \left(\frac{y}{r}\right)^2}} + Ey^4 + Fy^6 + Gy^8 + Hy^{10} + \ldots$$

$$0.79 \times 10^{-6} < |E| < 1.05 \times 10^{-6}.$$

In the formula of aspherical surface shown in the above, reference symbol r represents the radius of curvature of the vertex portion of the aspherical surface, reference symbol x represent the distance from an arbitrary point on the aspherical surface to the tangential plane which is tangential to the aspherical surface at the vertex thereof, reference symbol y represent the distance from said arbitrary point to the optical axis, and reference symbols E, F, G, H, ... respectively represent coefficients of aspherical surface.

If the value defined by the condition related to the coefficient of aspherical surface E shown in the above becomes smaller than the lower limit thereof, the correcting action by the aspherical surface becomes too weak and, as a result, spherical aberration and coma will be undercorrected. If the value defined by said condition becomes larger than the upper limit thereof, the correcting action by the aspherical surface comes into effect also at the portion near the optical axis and, consequently, zonal spherical aberration will be overcorrected.

As described already, for making the performance of lens systems favourable, it is generally preferable to arrange that the lenses located in rear of the stop have high refractive indices. Therefore, also in the lens system according to the present invention, it is preferable to arrange that the respective lens elements constituting the cemented doublet and the positive lens component in the third lens group III respectively have refractive indices higher than 1.7. If refractive indices of those lenses are made lower than 1.7, it is impossible to correct curvature of field satisfactorily.

Besides, retrofocus-type wide-angle lens systems show such tendency that curvature of field becomes considerably large and quality of image becomes unfavourable when the lens system is focused on an object at a short distance. Therefore, there exist various means for correction of aberrations at the time of focusing on an object at a short distance.

The lens system according to the present invention is arranged to make aberrations favourable even when focused on an object at a short distance by arranging that the lens system is focused by advancing the lens system as a whole at the same time as varying the airspace between the first lens group I and the second lens group II. As another means for correction of aberrations, it is also possible to arrange that the positive lens component in the second lens group II comprises two positive lens elements and rays become afocal in said airspace between said positive lens elements and to focus the lens system by advancing the lens system as a whole at the same time as varying said airspace so as to thereby keep aberrations favourable even when the lens system is focused on an object at a short distance.

DETAILED DESCRIPTION OF THE PREFERRED EMBODIMENTS

Figure 1:
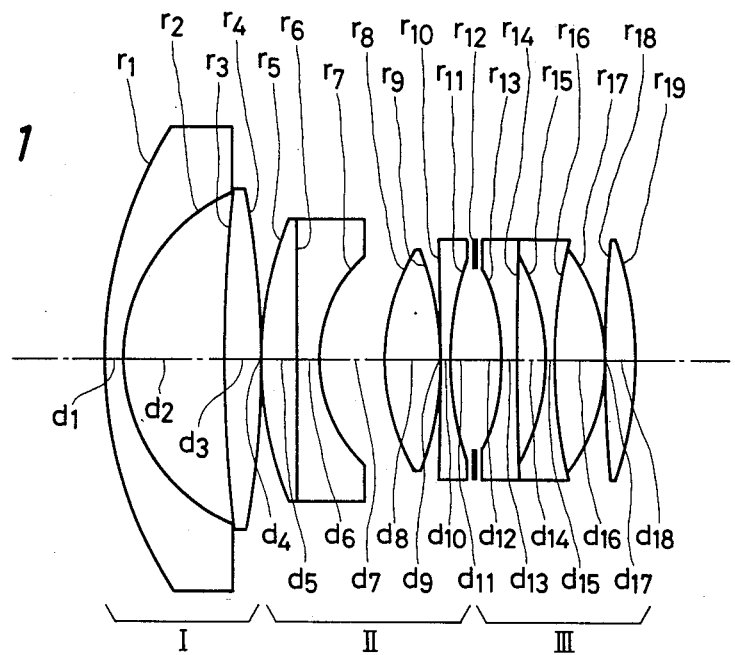
FIGS. 1 through 7 respectively show sectional views of Embodiments 1 through 7 of the large aperture ratio wide-angle photographic lens system according to the present invention.

Now, preferred embodiments of the large aperture ratio wide-angle photographic lens system according to the present invention are shown below.

Embodiment 1

| | | |
|---|---|---|
| $r_1 = 212.7228$ | | |
| $d_1 = 10.7345$ | $n_1 = 1.58921$ | $\nu_1 = 41.08$ |
| $r_2 = 90.7741$ | | |
| $d_2 = 52.7010$ | | |
| $r_3 = 984.8515$ | | |
| $d_3 = 18.6507$ | $n_2 = 1.58913$ | $\nu_2 = 60.97$ |
| $r_4 = -484.2667$ | | |
| $d_4 = 0.3661$ | | |
| $r_5 = 196.7089$ | | |
| $d_5 = 18.3470$ | $n_3 = 1.80518$ | $\nu_3 = 25.43$ |
| $r_6 = -5584.2503$ | | |
| $d_6 = 11.1192$ | $n_4 = 1.58921$ | $\nu_4 = 41.08$ |
| $r_7 = 72.3487$ | | |
| $d_7 = 34.6362$ | | |
| $r_8 = 105.8900$ | | |
| $d_8 = 28.8438$ | $n_5 = 1.71300$ | $\nu_5 = 53.84$ |
| $r_9 = -161.2411$ | | |
| $d_9 = 0.5980$ | | |
| $r_{10} = -1131.6585$ | | |
| $d_{10} = 5.0159$ | $n_6 = 1.58921$ | $\nu_6 = 41.08$ |
| $r_{11} = 153.2492$ | | |
| $d_{11} = 12.0409$ | | |
| $r_{12} = \infty$ (stop) | | |
| $d_{12} = 15.4852$ | | |
| $r_{13} = -151.8295$ (aspherical surface) | | |
| $d_{13} = 8.1081$ | $n_7 = 1.51742$ | $\nu_7 = 52.41$ |
| $r_{14} = \infty$ | | |
| $d_{14} = 14.3342$ | | |
| $r_{15} = -101.5101$ | | |
| $d_{15} = 5.2589$ | $n_8 = 1.84666$ | $\nu_8 = 23.88$ |
| $r_{16} = 250.1086$ | | |
| $d_{16} = 26.7816$ | $n_9 = 1.81600$ | $\nu_9 = 46.62$ |
| $r_{17} = -82.7431$ | | |
| $d_{17} = 0.3581$ | | |
| $r_{18} = 921.0977$ | | |
| $d_{18} = 14.2882$ | $n_{10} = 1.81600$ | $\nu_{10} = 46.62$ |
| $r_{19} = -184.3846$ | | |

$f = 100$, $f_I = -697.73$, $f_{In} = -277.804$
$f_{IIp} = 93.861$, $D = d_7 = 34.6362$
$E = -0.79764 \times 10^{-6}$, $F = -0.93688 \times 10^{-10}$
$G = -0.78646 \times 10^{-15}$, $H = -0.32028 \times 10^{-17}$
$\log|E| = -6.10$

Embodiment 2

| | | |
|---|---|---|
| $r_1 = 211.3640$ | | |
| $d_1 = 10.6196$ | $n_1 = 1.58875$ | $\nu_1 = 51.18$ |
| $r_2 = 88.6519$ | | |
| $d_2 = 52.5418$ | | |
| $r_3 = 513.1778$ | | |
| $d_3 = 18.8774$ | $n_2 = 1.58875$ | $\nu_2 = 51.18$ |
| $r_4 = -486.5498$ | | |
| $d_4 = 0.3622$ | | |
| $r_5 = 271.7749$ | | |
| $d_5 = 18.3096$ | $n_3 = 1.80518$ | $\nu_3 = 25.43$ |
| $r_6 = -2061.1302$ | | |
| $d_6 = 11.1279$ | $n_4 = 1.59551$ | $\nu_4 = 39.21$ |
| $r_7 = 82.7968$ | | |
| $d_7 = 34.4311$ | | |
| $r_8 = 99.3778$ | | |
| $d_8 = 28.5352$ | $n_5 = 1.72000$ | $\nu_5 = 46.03$ |
| $r_9 = -173.1764$ | | |
| $d_9 = 0.5916$ | | |
| $r_{10} = -2067.0856$ | | |
| $d_{10} = 4.9348$ | $n_6 = 1.59551$ | $\nu_6 = 39.21$ |
| $r_{11} = 141.7259$ | | |
| $d_{11} = 11.8978$ | | |
| $r_{12} = \infty$ (stop) | | |
| $d_{12} = 15.3023$ | | |
| $r_{13} = -145.5991$ (aspherical surface) | | |
| $d_{13} = 8.0338$ | $n_7 = 1.50400$ | $\nu_7 = 5.200$ |
| $r_{14} = \infty$ | | |
| $d_{14} = 14.1870$ | | |
| $r_{15} = -89.9779$ | | |
| $d_{15} = 5.2039$ | $n_8 = 1.84666$ | $\nu_8 = 23.88$ |
| $r_{16} = 270.7431$ | | |
| $d_{16} = 27.2056$ | $n_9 = 1.81600$ | $\nu_9 = 46.62$ |
| $r_{17} = -81.6984$ | | |
| $d_{17} = 0.3544$ | | |
| $r_{18} = 2024.6124$ | | |
| $d_{18} = 15.5461$ | $n_{10} = 1.81600$ | $\nu_{10} = 46.62$ |
| $r_{19} = -152.0902$ | | |

$f = 100$, $f_I = -1084.463$, $f_{In} = -267.952$
$f_{IIp} = 91.718$, $D = d_7 = 34.4311$
$E = -0.10442 \times 10^{-5}$, $F = -0.16473 \times 10^{-9}$
$G = 0.47666 \times 10^{-14}$, $H = -0.51029 \times 10^{-17}$
$\log|E| = -5.98$

Embodiment 3

| | | |
|---|---|---|
| $r_1 = 164.1239$ | | |
| $d_1 = 8.9717$ | $n_1 = 1.60311$ | $\nu_1 = 60.70$ |
| $r_2 = 73.3433$ | | |
| $d_2 = 41.1573$ | | |
| $r_3 = 932.0756$ | | |
| $d_3 = 13.8050$ | $n_2 = 1.58267$ | $\nu_2 = 46.33$ |
| $r_4 = -295.9703$ | | |
| $d_4 = 6.9013$ | | |
| $r_5 = 213.3130$ | | |
| $d_5 = 12.8309$ | $n_3 = 1.80518$ | $\nu_3 = 25.43$ |
| $r_6 = 237.4965$ | | |
| $d_6 = 3.6139$ | $n_4 = 1.49831$ | $\nu_4 = 65.03$ |
| $r_7 = 86.9413$ | | |
| $d_7 = 29.8399$ | | |
| $r_8 = 95.4424$ | | |
| $d_8 = 34.5090$ | $n_5 = 1.64250$ | $\nu_5 = 58.37$ |
| $r_9 = -142.9065$ | | |
| $d_9 = 1.7284$ | | |
| $r_{10} = \infty$ (stop) | | |
| $d_{10} = 5.4955$ | | |
| $r_{11} = 413.2088$ | | |
| $d_{11} = 2.9224$ | $n_6 = 1.58904$ | $\nu_6 = 53.20$ |
| $r_{12} = 88.1594$ | | |
| $d_{12} = 23.2212$ | | |
| $r_{13} = -53.4586$ | | |
| $d_{13} = 6.6922$ | $n_7 = 1.50400$ | $\nu_7 = 52.00$ |
| $r_{14} = -98.7747$ (aspherical surface) | | |
| $d_{14} = 5.5373$ | | |
| $r_{15} = -82.0987$ | | |
| $d_{15} = 4.0442$ | $n_8 = 1.84666$ | $\nu_8 = 23.88$ |
| $r_{16} = 340.9848$ | | |
| $d_{16} = 25.2433$ | $n_9 = 1.77250$ | $\nu_9 = 49.66$ |
| $r_{17} = -78.4058$ | | |
| $d_{17} = 0.3451$ | | |
| $r_{18} = 1532.1063$ | | |
| $d_{18} = 18.9786$ | $n_{10} = 1.77250$ | $\nu_{10} = 49.66$ |
| $r_{19} = -111.1287$ | | |

$f = 100$, $f_I = -764.207$, $f_{In} = -228.348$
$f_{IIp} = 94.412$, $D = d_7 = 29.8399$
$E = 0.88692 \times 10^{-6}$, $F = 0.22057 \times 10^{-9}$
$G = -0.10552 \times 10^{-12}$, $H = 0.31757 \times 10^{-16}$
$\log|E| = -6.05$

Embodiment 4

| | | |
|---|---|---|
| $r_1 = 156.0642$ | | |
| $d_1 = 11.2814$ | $n_1 = 1.61800$ | $\nu_1 = 63.38$ |
| $r_2 = 89.4227$ | | |
| $d_2 = 52.0924$ | | |
| $r_3 = -466.0466$ | | |
| $d_3 = 13.8049$ | $n_2 = 1.48749$ | $\nu_2 = 70.15$ |
| $r_4 = -240.7466$ | | |
| $d_4 = 6.9012$ | | |
| $r_5 = 228.5760$ | | |
| $d_5 = 17.9905$ | $n_3 = 1.80518$ | $\nu_3 = 25.43$ |
| $r_6 = \infty$ | | |
| $d_6 = 8.5576$ | $n_4 = 1.66998$ | $\nu_4 = 39.32$ |
| $r_7 = 96.7506$ | | |
| $d_7 = 47.5796$ | | |
| $r_8 = 94.3638$ | | |
| $d_8 = 25.1225$ | $n_5 = 1.81600$ | $\nu_5 = 46.62$ |
| $r_9 = -255.3891$ | | |
| $d_9 = 0.7329$ | | |
| $r_{10} = -12303.5912$ | | |
| $d_{10} = 5.0454$ | $n_6 = 1.59270$ | $\nu_6 = 35.29$ |
| $r_{11} = 105.6125$ | | |
| $d_{11} = 14.8167$ | | |
| $r_{12} = \infty$ (stop) | | |
| $d_{12} = 13.9409$ | | |
| $r_{13} = -72.4298$ | | |
| $d_{13} = 8.7730$ | $n_7 = 1.50400$ | $\nu_7 = 52.00$ |

$r_{14} = -119.3873$ (aspherical surface)
$d_{14} = 10.0162$
$r_{15} = -98.7983$
$d_{15} = 5.8771$  $n_8 = 1.84666$  $\nu_8 = 23.88$
$r_{16} = 356.3660$
$d_{16} = 25.2430$  $n_9 = 1.77250$  $\nu_9 = 49.66$
$r_{17} = -94.6352$
$d_{17} = 0.3451$
$r_{18} = 23665.8076$
$d_{18} = 16.5630$  $n_{10} = 1.77250$  $\nu_{10} = 49.66$
$r_{19} = -116.6842$
$f = 100$, $f_I = -627.417$, $f_{In} = -362.283$
$f_{IIp} = 87.258$, $D = d_7 = 47.5796$
$E = 0.97754 \times 10^{-6}$, $F = 0.12012 \times 10^{-9}$
$G = -0.34164 \times 10^{-14}$, $H = -0.52452 \times 10^{-18}$
$\log|E| = -6.01$ Embodiment 5

$r_1 = 242.7225$
$d_1 = 10.7090$  $n_1 = 1.62280$  $\nu_1 = 57.06$
$r_2 = 95.0823$
$d_2 = 44.6429$
$r_3 = 1269.4171$
$d_3 = 25.0188$  $n_2 = 1.62230$  $\nu_2 = 53.20$
$r_4 = -272.5227$
$d_4 = 9.2857$
$r_5 = 344.7205$
$d_5 = 13.5714$  $n_3 = 1.80518$  $\nu_3 = 25.43$
$r_6 = -1839.8690$
$d_6 = 3.5714$
$r_7 = -466.1647$
$d_7 = 5.8929$  $n_4 = 1.66998$  $\nu_7 = 39.32$
$r_8 = 103.5518$
$d_8 = 27.5433$
$r_9 = 92.8098$
$d_9 = 26.2500$  $n_5 = 1.81600$  $\nu_5 = 46.62$
$r_{10} = -241.6409$
$d_{10} = 0.5532$
$r_{11} = -735.4914$
$d_{11} = 5.4714$  $n_6 = 1.58904$  $\nu_6 = 53.20$
$r_{12} = 129.7980$
$d_{12} = 14.0029$
$r_{13} = \infty$ (stop)
$d_{13} = 18.8214$
$r_{14} = -76.2543$
$d_{14} = 8.2004$  $n_7 = 1.50400$  $\nu_7 = 52.00$
$r_{15} = -97.1871$ (aspherical surface)
$d_{15} = 8.9286$
$r_{16} = -80.7619$
$d_{16} = 5.6336$  $n_8 = 1.84666$  $\nu_8 = 23.88$
$r_{17} = 268.1878$
$d_{17} = 26.1268$  $n_9 = 1.77250$  $\nu_9 = 49.66$
$r_{18} = -90.0288$
$d_{18} = 0.3571$
$r_{19} = -15386.1909$
$d_{19} = 18.6429$  $n_{10} = 1.81600$  $\nu_{10} = 46.62$
$r_{20} = -116.8505$
$f = 100$, $f_I = -1816.485$, $f_{In} = -258.177$
$f_{IIp} = 85.179$, $D = d_8 = 27.5433$
$E = 0.96182 \times 10^{-6}$, $F = 0.15558 \times 10^{-9}$
$G = 0.91534 \times 10^{-14}$, $H = 0.57286 \times 10^{-18}$
$\log|E| = -6.02$ Embodiment 6

$r_1 = 236.3516$
$d_1 = 10.7087$  $n_1 = 1.64830$  $\nu_1 = 57.33$
$r_2 = 96.0618$
$d_2 = 44.6414$
$r_3 = 1481.0757$
$d_3 = 21.4279$  $n_2 = 1.60311$  $\nu_2 = 60.70$
$r_4 = -294.3310$
$d_4 = 11.0711$
$r_5 = 295.2622$
$d_5 = 13.5710$  $n_3 = 1.80518$  $\nu_3 = 25.43$
$r_6 = -1769.0704$
$d_6 = 3.5713$
$r_7 = -612.1743$
$d_7 = 5.8927$  $n_4 = 1.66998$  $\nu_4 = 39.32$
$r_8 = 97.1792$
$d_8 = 27.5423$
$r_9 = 92.9771$
$d_9 = 26.2492$  $n_5 = 1.81600$  $\nu_5 = 46.62$
$r_{10} = -255.1264$
$d_{10} = 0.5532$
$r_{11} = -1723.6643$
$d_{11} = 5.4713$  $n_6 = 1.58904$  $\nu_6 = 53.20$
$r_{12} = 126.1655$
$d_{12} = 14.0024$
$r_{13} = \infty$ (stop)
$d_{13} = 18.8208$
$r_{14} = -75.8547$
$d_{14} = 7.8569$  $n_7 = 1.50137$  $\nu_7 = 56.40$
$r_{15} = -160.7198$
$d_{15} = 1.0714$  $n_8 = 1.49216$  $\nu_8 = 57.50$
$r_{16} = -101.9118$ (aspherical surface)
$d_{16} = 8.2140$
$r_{17} = -82.6970$
$d_{17} = 5.3570$  $n_9 = 1.84666$  $\nu_9 = 23.88$
$r_{18} = 254.9063$
$d_{18} = 27.1420$  $n_{10} = 1.77250$  $\nu_{10} = 49.66$
$r_{19} = -89.1108$
$d_{19} = 0.3571$
$r_{20} = 3033.6362$
$d_{20} = 17.8566$  $n_{11} = 1.81600$  $\nu_{11} = 46.62$
$r_{21} = -125.5618$
$f = 100$, $f_I = -995.402$, $f_{In} = -253.526$
$f_{IIp} = 86.438$, $D = d_8 = 27.5423$
$E = 0.91718 \times 10^{-6}$, $F = 0.12071 \times 10^{-9}$
$G = 0.56621 \times 10^{-14}$, $H = 0.16151 \times 10^{-17}$
$\log|E| = -6.04$ Embodiment 7

$r_1 = 141.0631$
$d_1 = 8.8880$  $n_1 = 1.60311$  $\nu_1 = 60.70$
$r_2 = 75.3180$
$d_2 = 45.6606$
$r_3 = -1379.1765$
$d_3 = 14.3620$  $n_2 = 1.54771$  $\nu_2 = 62.83$
$r_4 = -219.4714$
$d_4 = 3.5468$
$r_5 = 598.1856$
$d_5 = 5.2636$  $n_3 = 1.58904$  $\nu_3 = 53.20$
$r_6 = 126.0424$
$d_6 = 37.4837$
$r_7 = 96.5110$
$d_7 = 11.1975$  $n_4 = 1.81600$  $\nu_4 = 46.62$
$r_8 = 144.3570$
$d_8 = 7.5869$
$r_9 = 130.5190$
$d_9 = 20.3422$  $n_5 = 1.81600$  $\nu_5 = 46.62$
$r_{10} = -206.9942$
$d_{10} = 0.8684$
$r_{11} = -502.7700$
$d_{11} = 5.0635$  $n_6 = 1.63854$  $\nu_6 = 55.38$
$r_{12} = 116.9654$
$d_{12} = 11.6916$
$r_{13} = \infty$ (stop)
$d_{13} = 17.5876$
$r_{14} = -72.6506$
$d_{14} = 9.4994$  $n_7 = 1.51742$  $\nu_7 = 52.41$
$r_{15} = -90.6333$ (aspherical surface)
$d_{15} = 10.2639$
$r_{16} = -69.3864$
$d_{16} = 5.9412$  $n_8 = 1.84666$  $\nu_8 = 23.88$
$r_{17} = 314.2332$
$d_{17} = 25.2397$  $n_9 = 1.77250$  $\nu_9 = 49.66$
$r_{18} = -82.6406$
$d_{18} = 0.3450$
$r_{19} = 2969.0568$
$d_{19} = 16.9676$  $n_{10} = 1.81600$  $\nu_{10} = 46.62$
$r_{20} = -120.8530$
$f = 100$, $f_I = -941.954$, $f_{In} = -282.307$
$f_{IIp} = 82.453$, $D = d_6 = 37.4837$
$E = 0.90512 \times 10^{-6}$, $F = 0.31877 \times 10^{-9}$
$G = -0.13990 \times 10^{-12}$, $H = 0.49195 \times 10^{-16}$
$\log|E| = -6.04$ In the numerical data of respective embodiments shown in the above, reference symbols $r_1, r_2, \ldots$ respectively represent radii of curvature of respective lens surfaces, reference symbols, $d_1, d_2, \ldots$ respectively represent thickness of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

Figure 2:
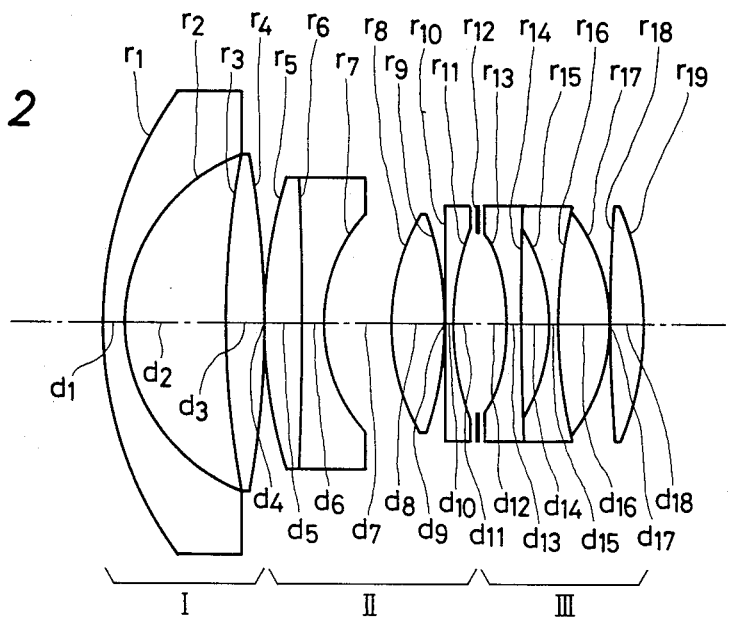

Embodiments 1 and 2 respectively have the lens configurations as shown in FIGS. 1 and 2. Each of them comprises a first lens group I comprising a negative lens component and a positive lens component, a second lens group II comprising a lens component arranged as a cemented doublet, which consists of a positive lens element and a negative lens element cemented together, a positive lens component and a negative lens component, and a third lens group III comprising a negative lens component, a lens component arranged as a cemented doublet, which consists of a negative lens element and a positive lens element cemented together, and a positive lens component. Besides, the stop is arranged between the second lens group II and the third lens group III, and the surface just behind the stop (surface $r_{13}$) is formed as an aspherical surface.

Figure 3:
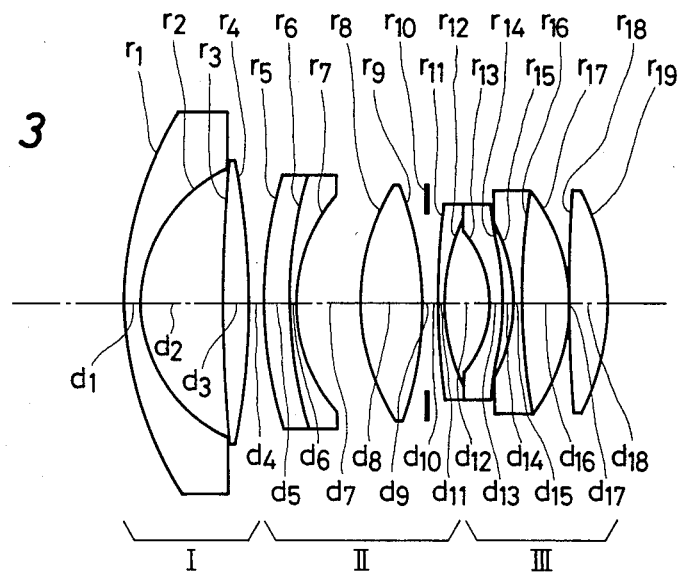

Embodiment 3 has the lens configuration as shown in FIG. 3. In Embodiment 3, the stop is arranged between the positive lens component in the second lens group II and the negative lens component arranged on the image side in the second lens group II, and the surface on the image side (surface $r_{14}$) of the negative lens component in the third lens group III is formed as an aspherical surface.

Figure 4:
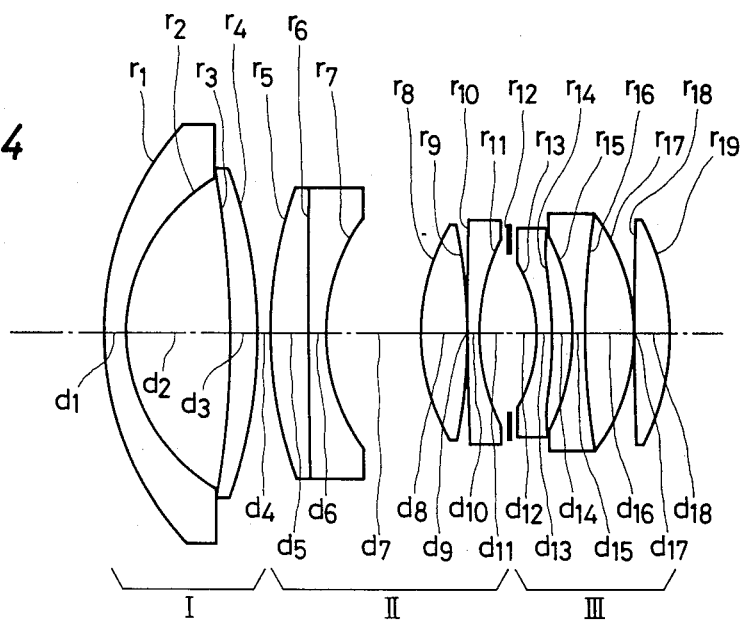

Embodiment 4 has the lens configuration as shown in FIG. 4. In Embodiment 4, the stop is arranged between the second lens group II and the third lens group III, and the surface on the image side (surface $r_{14}$) of the negative lens component in the third lens group III is formed as an aspherical surface.

Figure 5:
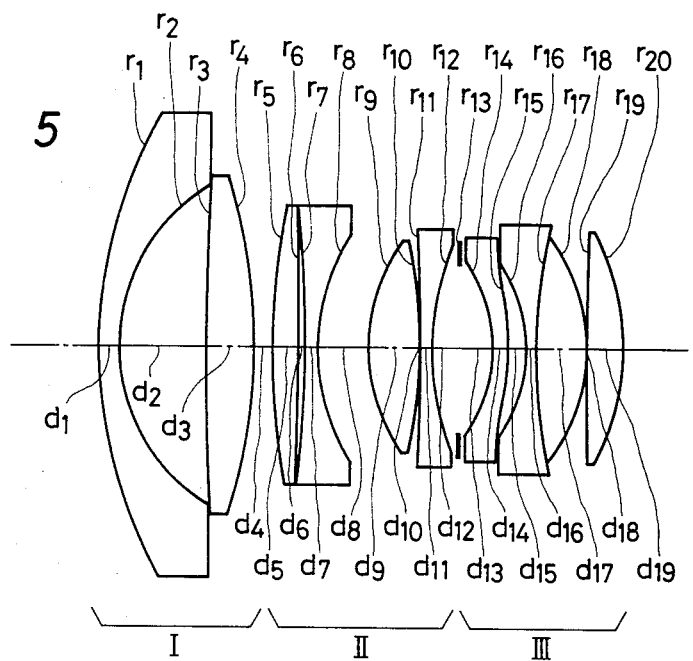
Figure 6:
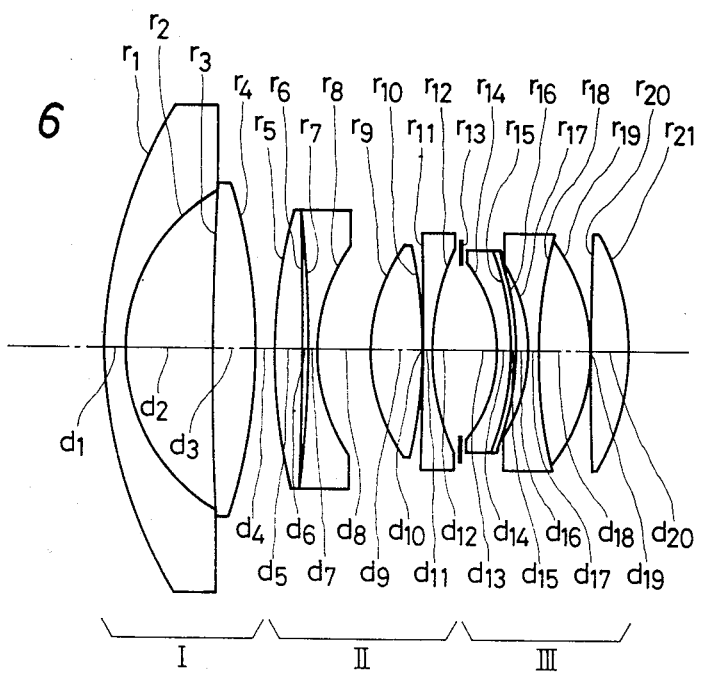

Embodiments 5 and 6 respectively have the lens configurations as shown in FIGS. 5 and 6. Each of them comprises a first lens group I comprising a negative lens component and a positive lens component, a second lens group II comprising a lens component, which comprises a positive lens element and a negative lens element, a positive lens component and a negative lens component, and a third lens group III comprising a negative lens component, a lens component arranged as a cemented doublet, which consists of a negative lens element and a positive lens element cemented together, and a positive lens component. In each of Embodiments 5 and 6, the stop is arranged between the second lens group II and the third lens group III. Besides, the surface on the image side (surface $r_{15}$ in Embodiment 5 and surface $r_{16}$ in Embodiment 6) of the negative lens component in the third lens group III is formed as an aspherical surface.

Figure 7:
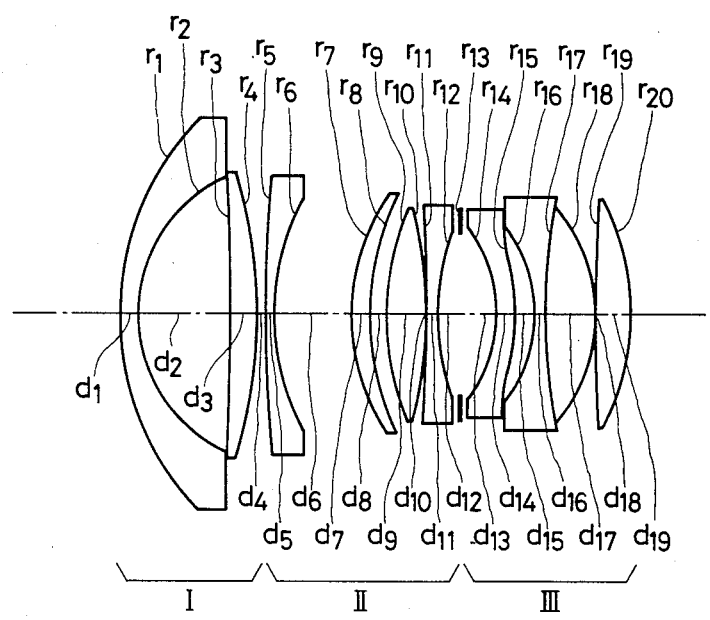
Figure 8:
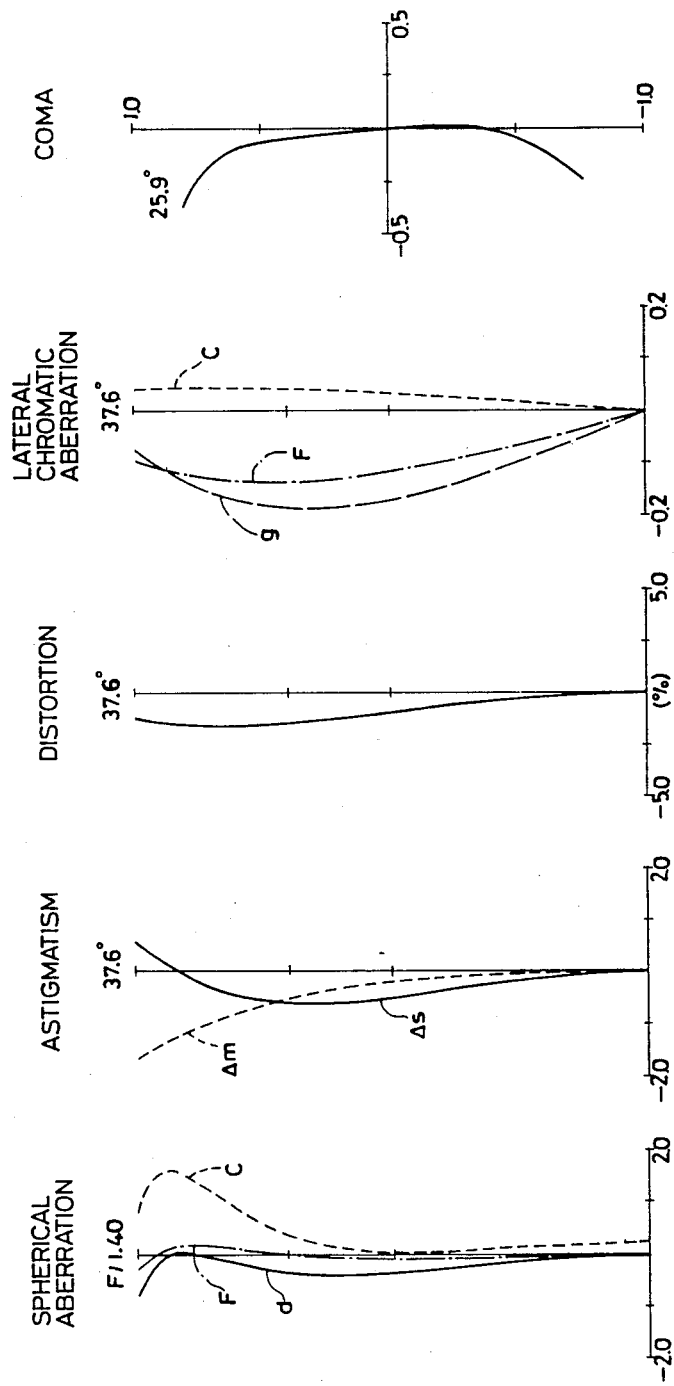
FIGS. 8 through 14 respectively show graphs illustrating aberration curves of Embodiments 1 through 7 of the lens system according to the present invention.
Figure 9:
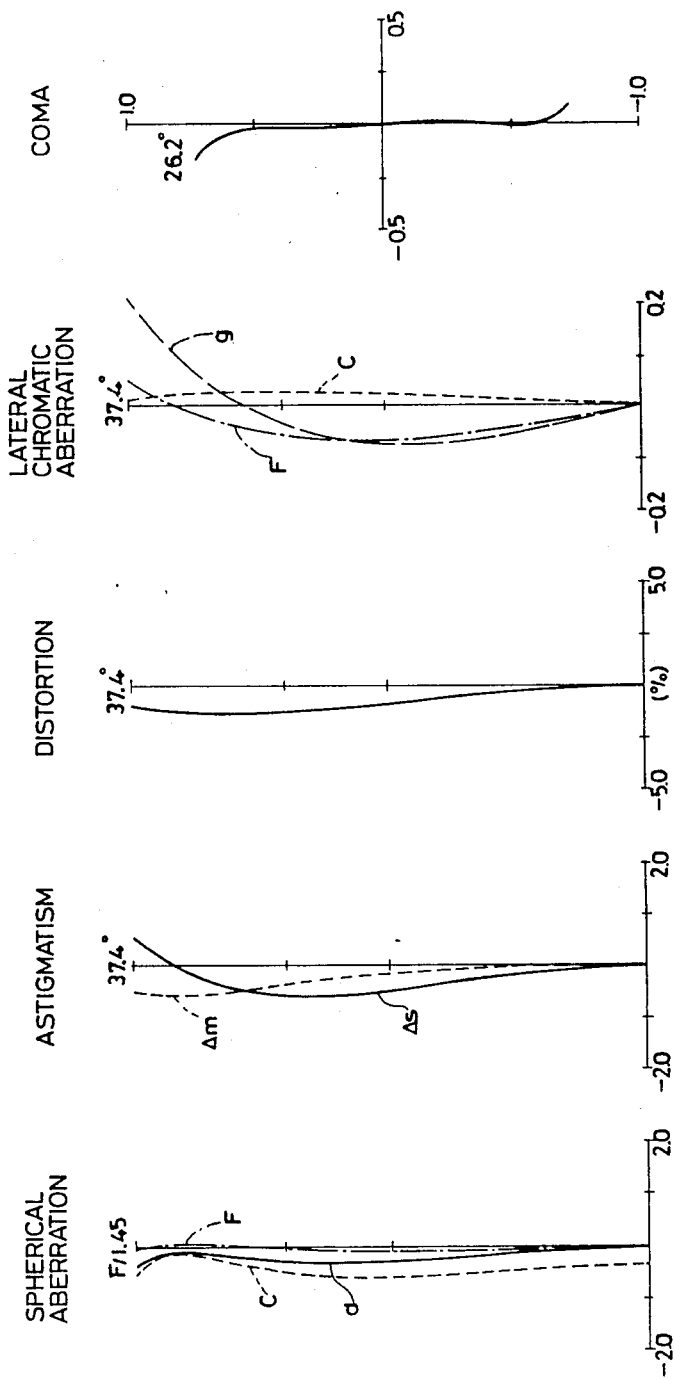
Figure 10:
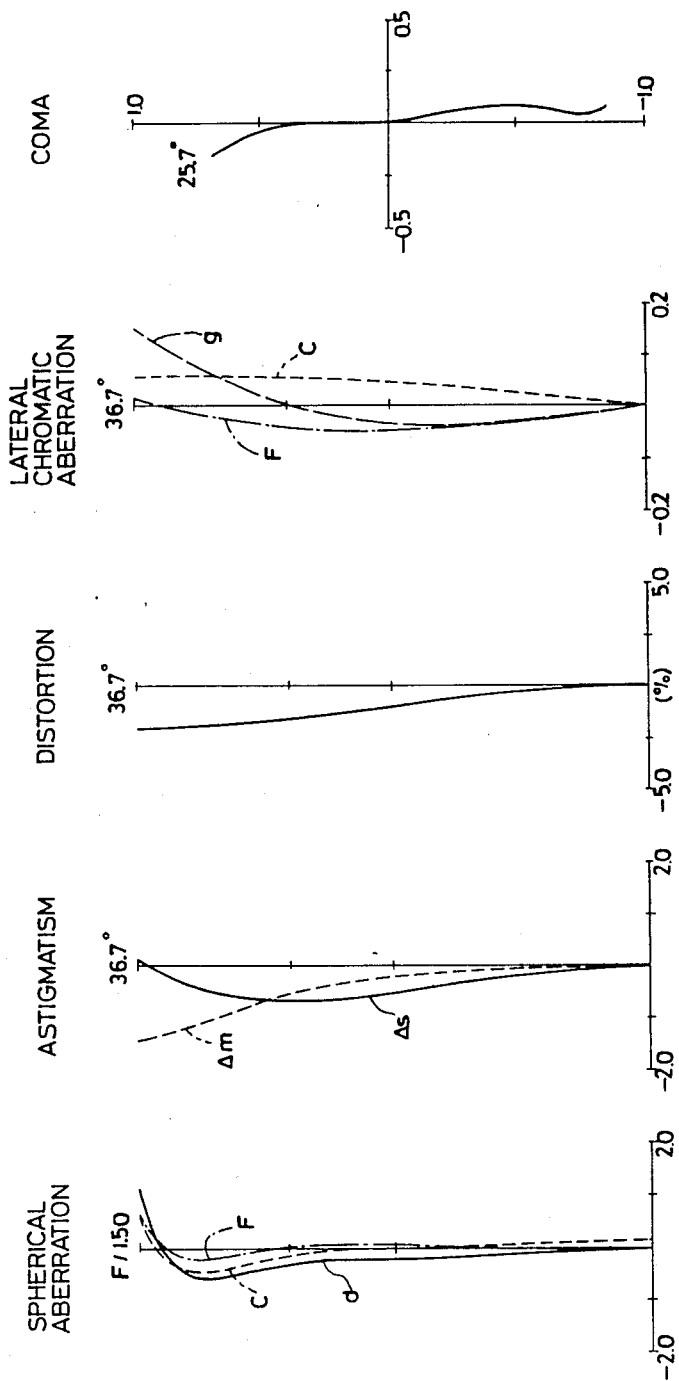
Figure 11:
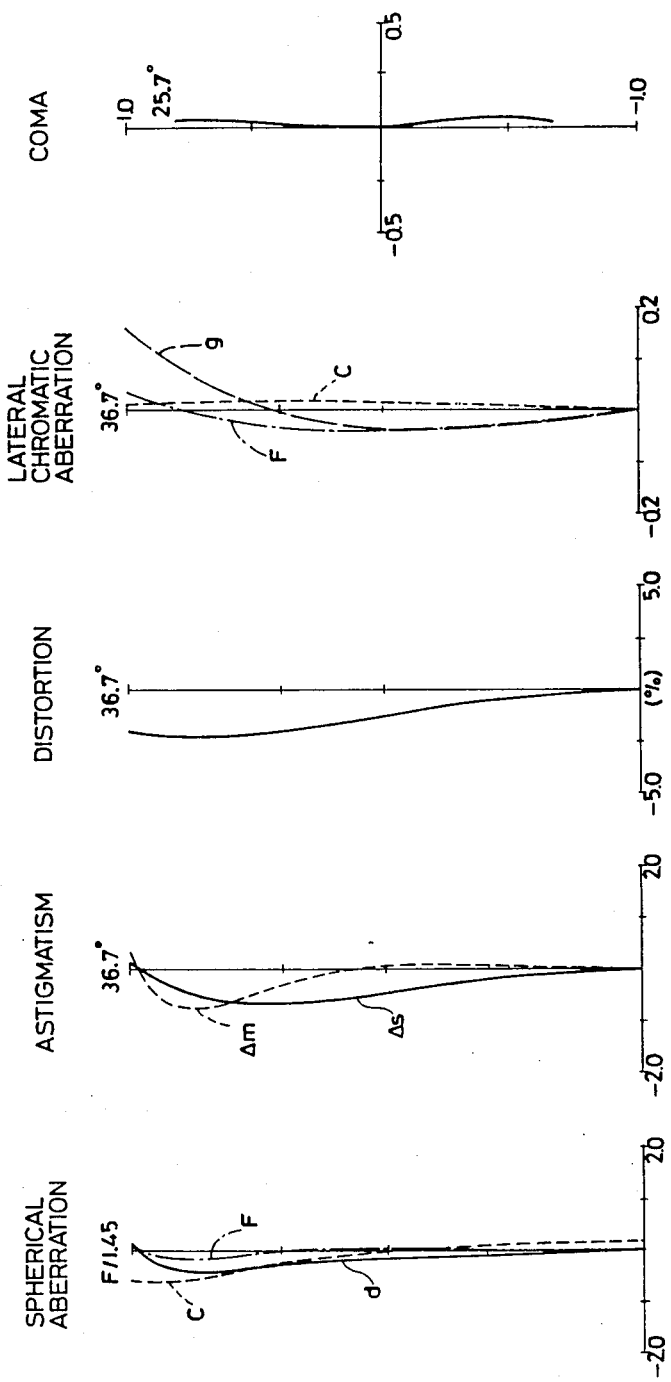
Figure 12:
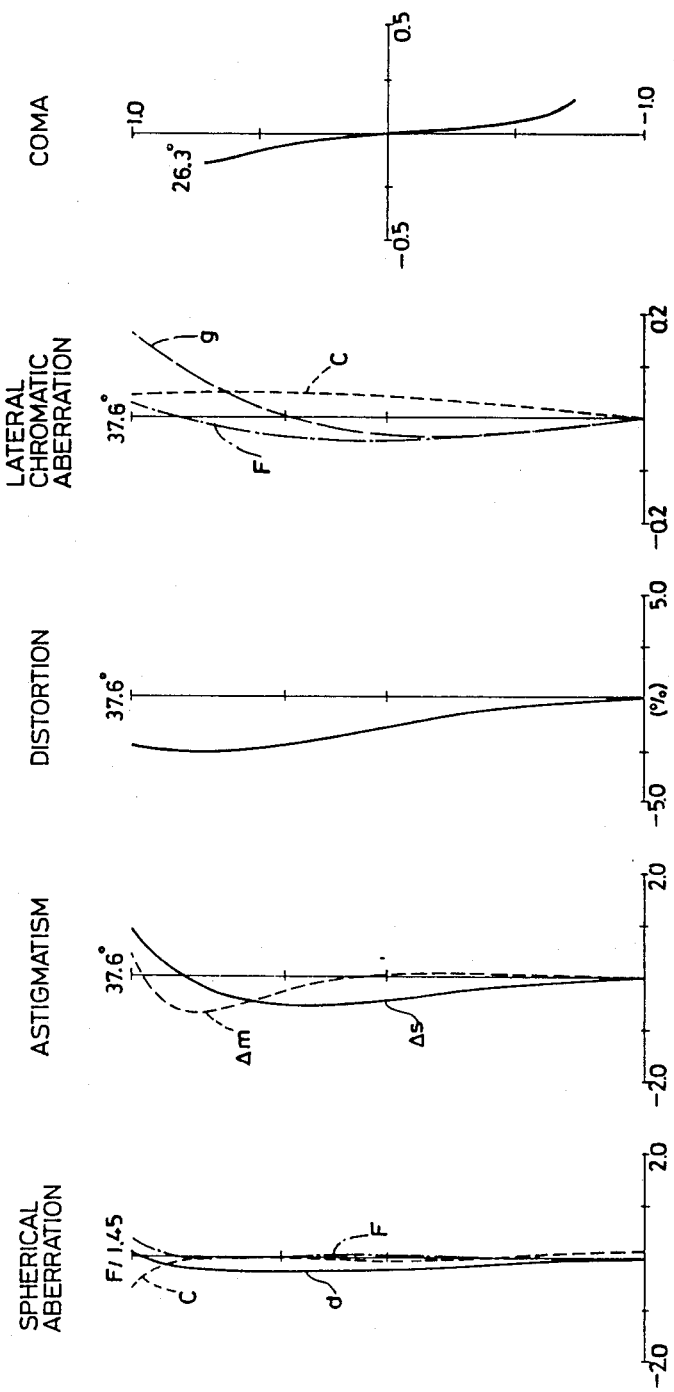
Figure 13:
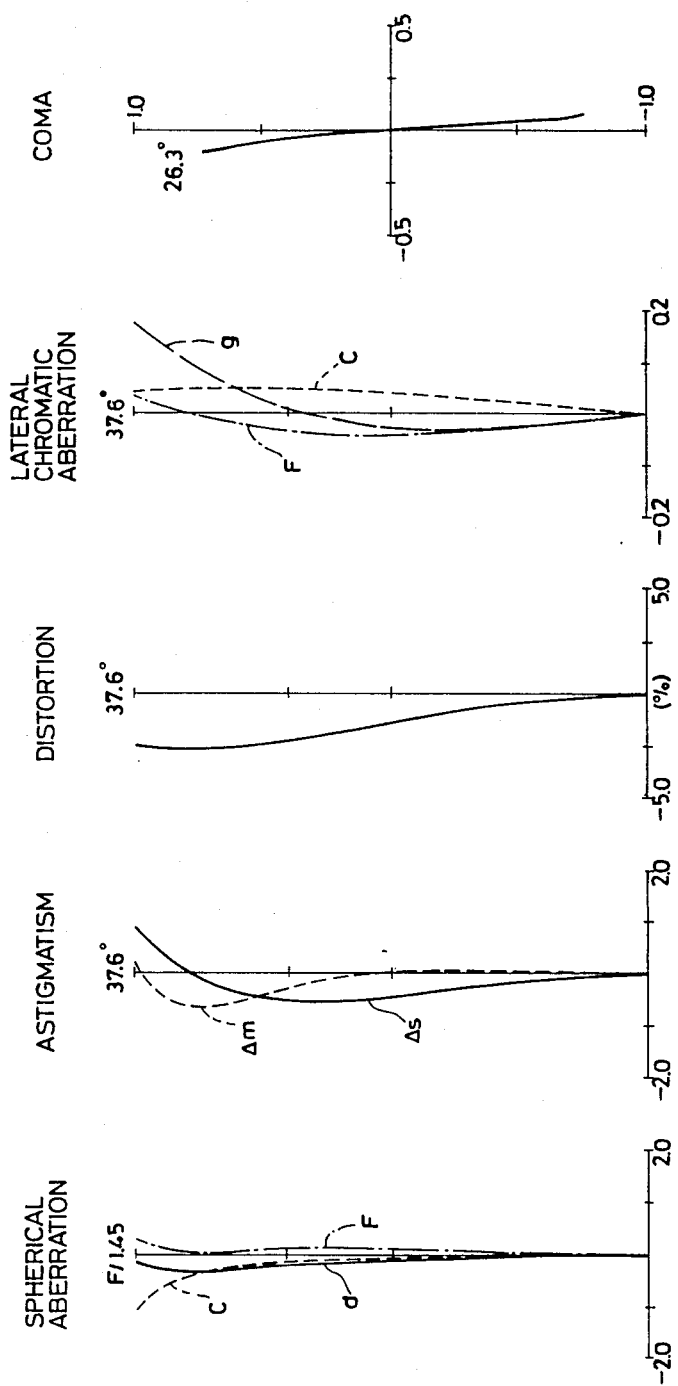
Figure 14:
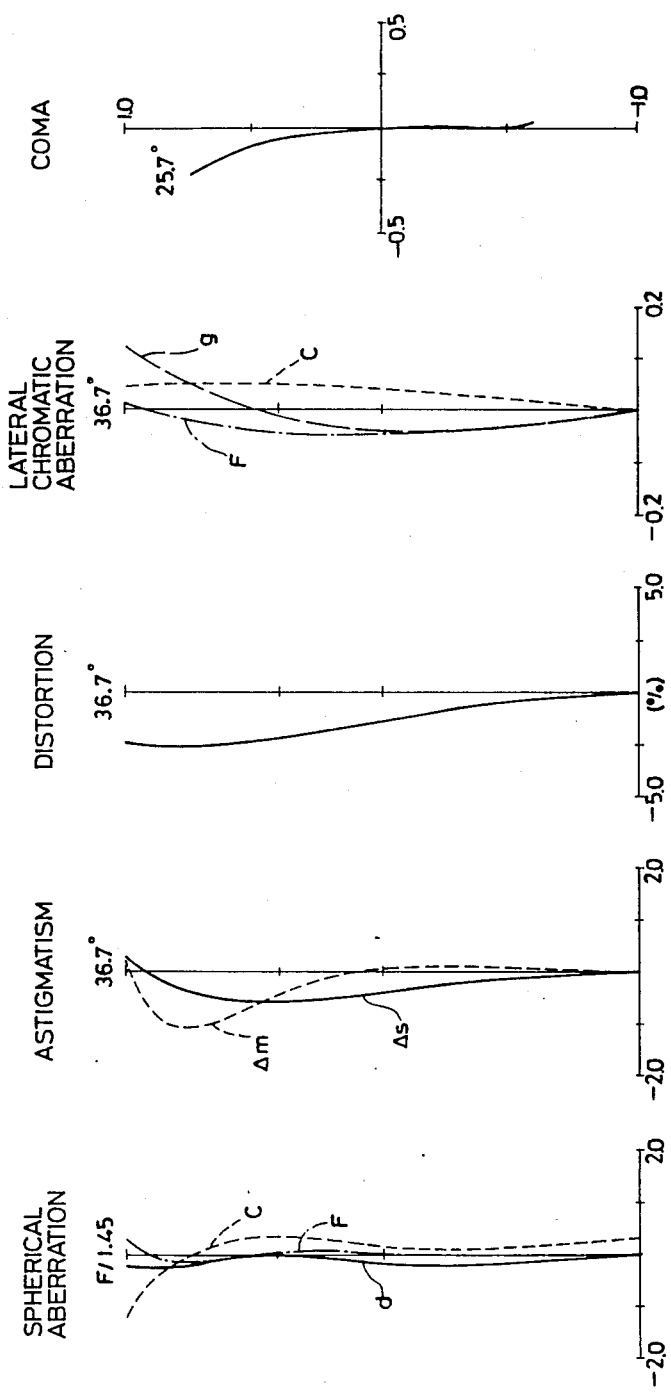

Embodiment 7 has the lens configuration as shown in FIG. 7 and comprises a first lens group I comprising a negative lens component and a positive lens component, a second lens group II comprising a negative lens component, a positive lens component which comprises two positive lens elements, and a negative lens component, and a third lens group III comprising a negative lens component, a lens component arranged as a cemented doublet, which consists of a negative lens element and a positive lens element, and a positive lens component. In Embodiment 7, the stop is arranged between the second lens group II and the third lens group III, and the surface on the image side (surface $r_{15}$) of the negative lens component in the third lens group III is formed as an aspherical surface.

In respective embodiments shown in the above, except Embodiments 1 and 7, the aspherical surface is provided to a plastic lens. In case of Embodiment 6, the aspherical surface is provided to a replica lens which is formed by cementing an aspherical lens made of plastic material onto the image side of a spherical lens made of glass material.

Figure 15:
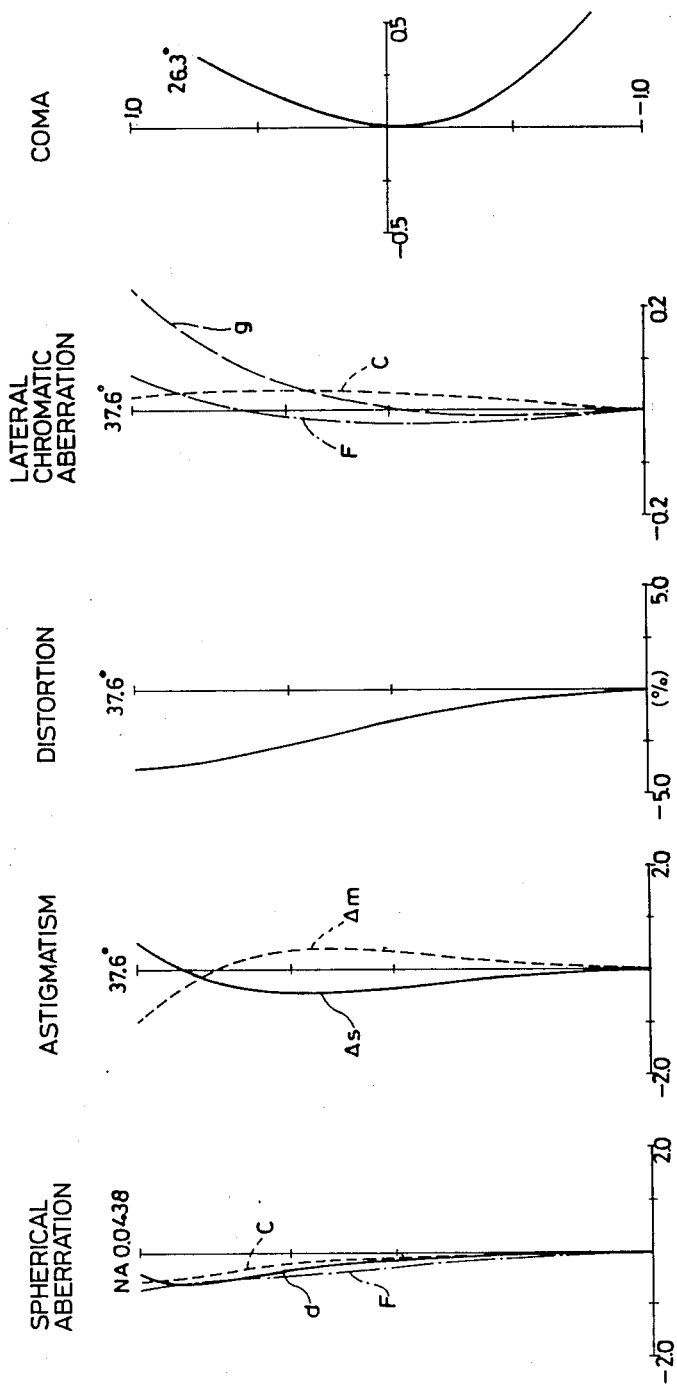
FIGS. 15 and 16 respectively show graphs illustrating aberration curves of Embodiments 6 and 7 of the present invention when focused on an object at a short distnace.

Embodiment 6 is arranged that correction of aberrations at the time of focusing on an object at a short distance is made by varying the airspace $d_4$ between the first lens group I and the second lens group II. At that time, the lens system is focused on an object at the distance where the magnification becomes 1/7.1 by varying the airspace $d_4$ from 1.0711, i.e., the value when the lens system is focused on an object at the infinite distance, to 2.143. Aberration curves of Embodiment 6 when focused on an object at said short distance are as shown in FIG. 15.

Figure 16:
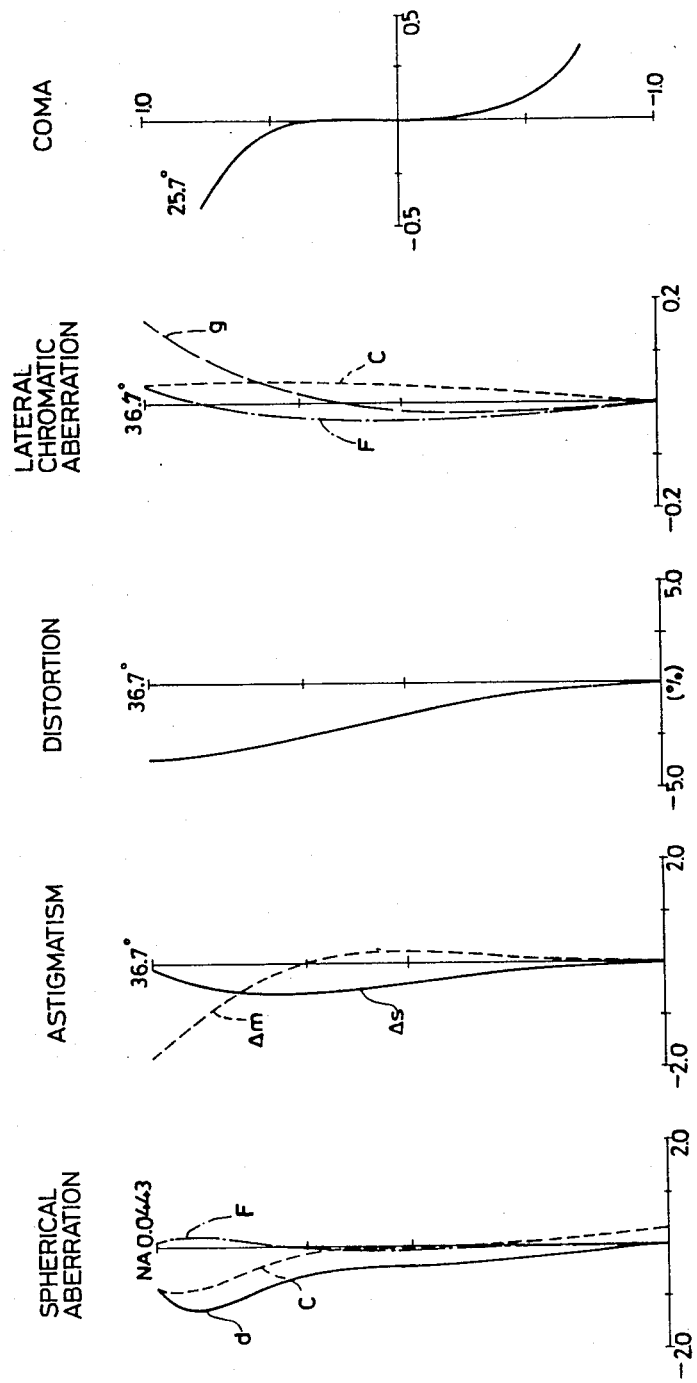

Embodiment 7 is arranged that correction of aberrations at the time of focusing on an object at a short distance is made by varying the airspace $d_8$ between the two positive lens elements constituting the positive lens component, which comprises two positive lens elements, in the second lens group II. At that time, the lens system is focused on an object at the distance where the magnification becomes 1/6.8 by varying the airspace $d_8$ from 7.5868, i.e., the value when the lens system is focused on an object at the infinite distance, to 0.704. Aberration curves of Embodiment 7 when focused on an object at said short distance are as shown in FIG. 16.

Aberration curves of Embodiments 1 through 7 when focused on an object at the infinite distance are respectively shown in FIGS. 8 through 14.

I claim:

1. A large aperture ratio wide-angle photographic lens system consisting of, in the order from the object side, a first lens group comprising a negative lens component and a positive lens component, a second lens group comprising a lens component, which comprises at least one negative lens element and has negative refractive power as a whole, a positive lens component and a negative lens component, and a third lens group comprising a negative lens component, a positive lens component arranged as a cemented doublet, which consists of a negative lens element and a positive lens element, and a positive lens component, said large aperture ratio wide angle photographic lens system being arranged that a stop is located between said positive lens component in said second leng group and said third lens group and that an aspherical surface is provided near said stop, said large aperture ratio wide-angle photographic lens system having an aperture ratio of about F/1.4 and being further arranged to fulfill the following conditions:

$$4.0 < |f_I/f| < 30\, f_I < 0 \tag{1}$$

$$1.7 < |f_{In}/f| < 5.0, f_{In} < 0 \tag{2}$$

$$0.5 < f_{IIp}/f < 2.0 \tag{3}$$

$$0.2 < D/f < 0.7 \tag{4}$$

where, reference symbol f represents the focal length of the lens system as a whole, reference symbol $f_I$ represents the total focal length of the first lens group, reference symbol $f_{In}$ represents the focal length of the negative lens component in the first lens group, reference symbol $f_{IIp}$ represents the focal length of the positive lens component in the second lens group, and reference symbol D represents the airspace between the negative lens component arranged on the object side in the second lens group and the positive lens component in the second lens group.

2. A large aperture ratio wide-angle photographic lens system according to claim 1 wherein said aspherical surface is formed on a plastic lens.

3. A large aperture ratio wide-angle photographic lens system according to claim 1 wherein said aspherical surface is formed by cementing an aspherical lens made of plastic material to a spherical lens made of glass material.

4. A large aperture ratio wide-angle photographic lens system according to claim 1 wherein said negative lens component located on the object side in said second lens group is arranged as a cemented doublet, which consists of a positive lens element and a negative lens element, and the surface on the object side of said negative lens component in said third lens group is formed as an aspherical surface expressed by the formula shown below, said large aperture ratio wide-angle photographic lens system having the following numerical data:

---

$r_1 = 212.7228$
  $d_1 = 10.7345$   $n_1 = 1.58721$   $\nu_1 = 41.08$
$r_2 = 90.7741$
  $d_2 = 52.7010$
$r_3 = 984.8515$
  $d_3 = 18.6507$   $n_2 = 1.58913$   $\nu_2 = 60.97$
$r_4 = -484.2667$
  $d_4 = 0.3661$
$r_5 = 196.7089$
  $d_5 = 18.3470$   $n_3 = 1.80518$   $\nu_3 = 25.43$
$r_6 = -5584.2503$
  $d_6 = 11.1192$   $n_4 = 1.58921$   $\nu_4 = 41.08$
$r_7 = 72.3487$
  $d_7 = 34.6362$
$r_8 = 105.8900$
  $d_8 = 28.8438$   $n_5 = 1.71300$   $\nu_5 = 53.84$
$r_9 = -161.2411$
  $d_9 = 0.5980$
$r_{10} = -1131.6585$
  $d_{10} = 5.0159$   $n_6 = 1.58921$   $\nu_6 = 41.08$
$r_{11} = 153.2492$
  $d_{11} = 12.0409$
$r_{12} = \infty$ (stop)
  $d_{12} = 15.4852$
$r_{13} = -151.8295$ (aspherical surface)
  $d_{13} = 8.1081$   $n_7 = 1.51742$   $\nu_7 = 52.41$
$r_{14} = \infty$
  $d_{14} = 14.3342$
$r_{15} = -101.5101$
  $d_{15} = 5.2589$   $n_8 = 1.84666$   $\nu_8 = 23.88$
$r_{16} = 250.1086$
  $d_{16} = 26.7816$   $n_9 = 1.81600$   $\nu_9 = 46.62$
$r_{17} = -82.7431$
  $d_{17} = 0.3581$
$r_{18} = 921.0977$
  $d_{18} = 14.2882$   $n_{10} = 1.81600$   $\nu_{10} = 46.62$
$r_{19} = -184.3846$
$f = 100, f_I = -697.73, f_{In} = -277.804$
$f_{IIp} = 93.861, D = d_7 = 34.6362$
$E = -0.79764 \times 10^{-6}, F = -0.93688 \times 10^{-10}$
$G = -0.78646 \times 10^{-15}, H = -0.32028 \times 10^{-17}$
$\log|E| = -6.10$ $$x = \frac{\frac{y^2}{r}}{1 + \sqrt{1 - \left(\frac{y}{r}\right)^2}} + Ey^4 + Fy^6 + Gy^8 + Hy^{10} + \ldots$$

--- where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol r represents the radius of curvature of the vertex portion of the aspherical surface, reference symbol x represents the distance from an arbitrary point on the aspherical surface to the tangential plane which is tangential to the aspherical surface at the vertex thereof, reference symbol y represents the distance from said arbitrary point to the optical axis, and reference symbols E, F, G, H, . . . respectively represent coefficients of aspherical surface.

5. A large aperture ratio wide-angle photographic lens system according to claim 2 wherein said negative lens component located on the object side in said second lens group is arranged as a cemented doublet, which consists of a positive lens element and a negative lens element, and the surface on the object side of said negative lens component in said third lens group is formed as an aspherical surface expressed by the formula shown below, said large aperture ratio wide-angle photographic lens system having the following numerical data:

---

$r_1 = 211.3640$
  $d_1 = 10.6196$   $n_1 = 1.58875$   $\nu_1 = 51.18$
$r_2 = 88.6519$
  $d_2 = 52.5418$
$r_3 = 513.1778$
  $d_3 = 18.8774$   $n_2 = 1.58875$   $\nu_2 = 51.18$
$r_4 = -486.5498$
  $d_4 = 0.3622$
$r_5 = 271.7749$
  $d_5 = 18.3096$   $n_3 = 1.80518$   $\nu_3 = 25.43$
$r_6 = -2061.1302$
  $d_6 = 11.1279$   $n_4 = 1.59551$   $\nu_4 = 39.21$
$r_7 = 82.7968$
  $d_7 = 34.4311$
$r_8 = 99.3778$
  $d_8 = 28.5352$   $n_5 = 1.72000$   $\nu_5 = 46.03$
$r_9 = -173.1764$
  $d_9 = 0.5916$
$r_{10} = -2067.0856$
  $d_{10} = 4.9348$   $n_6 = 1.59551$   $\nu_6 = 39.21$
$r_{11} = 141.7259$
  $d_{11} = 11.8978$
$r_{12} = \infty$ (stop)
  $d_{12} = 15.3023$
$r_{13} = -145.5991$ (aspherical surface)
  $d_{13} = 8.0338$   $n_7 = 1.50400$   $\nu_7 = 52.00$
$r_{14} = \infty$
  $d_{14} = 14.1870$
$r_{15} = -89.9779$
  $d_{15} = 5.2039$   $n_8 = 1.84666$   $\nu_8 = 23.88$
$r_{16} = 270.7431$
  $d_{16} = 27.2056$   $n_9 = 1.81600$   $\nu_9 = 46.62$
$r_{17} = -81.6984$
  $d_{17} = 0.3544$
$r_{18} = 2024.6124$
  $d_{18} = 15.5461$   $n_{10} = 1.81600$   $\nu_{10} = 46.62$
$r_{19} = -152.0902$
$f = 100, f_I = -1084.463, f_{In} = -267.952$
$f_{IIp} = 91.718, D = d_7 = 34.4311$
$E = -0.10442 \times 10^{-5}, F = -0.16473 \times 10^{-9}$
$G = 0.47666 \times 10^{-14}, H = -0.51029 \times 10^{-17}$
$\log|E| = -5.98$ $$x = \frac{\frac{y^2}{r}}{1 + \sqrt{1 - \left(\frac{y}{r}\right)^2}} + Ey^4 + Fy^6 + Gy^8 + Hy^{10} + \ldots$$

--- where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol r represents the radius of curvature of the vertex portion of the aspherical surface, reference symbol x represents the distance from an arbitrary point on the aspherical surface to the tangential plane which is tangential to the aspherical surface at the vertex thereof, reference symbol y represents the distance from said arbitrary point to the optical axis, and reference symbols $E, F, G, H, \ldots$ respectively represent coefficients of aspherical surface.

6. A large aperture ratio wide-angle photographic lens system according to claim 2 wherein said negative lens component located on the object side in said second lens group is arranged as a cemented doublet, which consists of a positive lens element and a negative lens element, and the surface on the image side of said negative lens component in said third lens group is formed as an aspherical surface expressed by the formula shown below, said large aperture ratio wide-angle photographic lens system having the following numerical data:

$r_1 = 164.1239$
 $d_1 = 8.9717$   $n_1 = 1.60311$   $\nu_1 = 60.70$
$r_2 = 73.3433$
 $d_2 = 41.1573$
$r_3 = 932.0756$
 $d_3 = 13.8050$  $n_2 = 1.58267$   $\nu_2 = 46.33$
$r_4 = -295.9703$
 $d_4 = 6.9013$
$r_5 = 213.3130$
 $d_5 = 12.8309$  $n_3 = 1.80518$   $\nu_3 = 25.43$
$r_6 = 237.4965$
 $d_6 = 3.6139$   $n_4 = 1.49831$   $\nu_4 = 65.03$
$r_7 = 86.9413$
 $d_7 = 29.8399$
$r_8 = 95.4424$
 $d_8 = 34.5090$  $n_5 = 1.64250$   $\nu_5 = 58.37$
$r_9 = -142.9065$
 $d_9 = 1.7284$
$r_{10} = \infty$ (stop)
 $d_{10} = 5.4955$
$r_{11} = 413.2088$
 $d_{11} = 2.9224$  $n_6 = 1.58904$   $\nu_6 = 53.20$
$r_{12} = 88.1594$
 $d_{12} = 23.2212$
$r_{13} = -53.4586$
 $d_{13} = 6.6922$  $n_7 = 1.50400$   $\nu_7 = 52.00$
$r_{14} = -98.7747$ (aspherical surface)
 $d_{14} = 5.5373$
$r_{15} = -82.0987$
 $d_{15} = 4.0442$  $n_8 = 1.84666$   $\nu_8 = 23.88$
$r_{16} = 340.9848$
 $d_{16} = 25.2433$ $n_9 = 1.77250$   $\nu_9 = 49.66$
$r_{17} = -78.4058$
 $d_{17} = 0.3451$
$r_{18} = 1532.1063$
 $d_{18} = 18.9786$ $n_{10} = 1.77250$ $\nu_{10} = 49.66$
$r_{19} = -111.1287$
$f = 100, f_I = -764.207, f_{In} = -228.348$
$f_{IIp} = 94.412, D = d_7 = 29.8399$
$E = 0.88692 \times 10^{-6}, F = 0.22057 \times 10^{-9}$
$G = -0.10552 \times 10^{-12}, H = 0.31757 \times 10^{-16}$
$\log|E| = -6.05$ $$x = \frac{\frac{y^2}{r}}{1 + \sqrt{1 - \left(\frac{y}{r}\right)^2}} + Ey^4 + Fy^6 + Gy^8 + Hy^{10} + \ldots$$

where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lesnes, reference symbol r represents the radius of curvature of the vertex portion of the aspherical surface, reference symbol x represents the distance from an arbitrary point on the aspherical surface to the tangential plane which is tangential to the aspherical surface at the vertex thereof, reference symbol y represents the distance from said arbitrary point to the optical axis, and reference symbols $E, F, G, H, \ldots$ respectively represent coefficients of aspherical surface.

7. A large aperture ratio wide-angle photographic lens system according to claim 2 wherein said negative lens component located on the object side in said second lens group is arranged as a cemented doublet, which consists of a positive lens element and a negative lens element, and the surface on the image side of said negative lens component in said third lens group is formed as an aspherical surface expressed by the formula shown below, said large aperture ratio wide-angle photographic lens system having the following numerical data:

$r_1 = 156.0642$
 $d_1 = 11.2814$  $n_1 = 1.61800$   $\nu_1 = 63.38$
$r_2 = 89.4227$
 $d_2 = 52.0924$
$r_3 = -466.0466$
 $d_3 = 13.8049$  $n_2 = 1.48749$   $\nu_2 = 70.15$
$r_4 = -240.7466$
 $d_4 = 6.9012$
$r_5 = 228.5760$
 $d_5 = 17.9905$  $n_3 = 1.80518$   $\nu_3 = 25.43$
$r_6 = \infty$
 $d_6 = 8.5576$   $n_4 = 1.66998$   $\nu_4 = 39.32$
$r_7 = 96.7506$
 $d_7 = 47.5796$
$r_8 = 94.3638$
 $d_8 = 25.1225$  $n_5 = 1.81600$   $\nu_5 = 46.62$
$r_9 = -255.3891$
 $d_9 = 0.7329$
$r_{10} = -12303.5912$
 $d_{10} = 5.0454$  $n_6 = 1.59270$   $\nu_6 = 35.29$
$r_{11} = 105.6125$
 $d_{11} = 14.8167$
$r_{12} = \infty$ (stop)
 $d_{12} = 13.9409$
$r_{13} = -72.4298$
 $d_{13} = 8.7730$  $n_7 = 1.50400$   $\nu_7 = 52.00$
$r_{14} = -119.3873$ (aspherical surface)
 $d_{14} = 10.0162$
$r_{15} = -98.7983$
 $d_{15} = 5.8771$  $n_8 = 1.84666$   $\nu_8 = 23.88$
$r_{16} = 356.3660$
 $d_{16} = 25.2430$ $n_9 = 1.77250$   $\nu_9 = 49.66$
$r_{17} = -94.6352$
 $d_{17} = 0.3451$
$r_{18} = 23665.8076$
 $d_{18} = 16.5630$ $n_{10} = 1.77250$ $\nu_{10} = 49.66$
$r_{19} = -116.6842$
$f = 100, f_I = -627.417, f_{In} = -362.283$
$f_{IIp} = 87.258, D = d_7 = 47.5796$
$E = 0.97754 \times 10^{-6}, F = 0.12012 \times 10^{-9}$
$G = -0.34164 \times 10^{-14}, H = -0.52452 \times 10^{-18}$
$\log|E| = -6.01$ $$x = \frac{\frac{y^2}{r}}{1 + \sqrt{1 - \left(\frac{y}{r}\right)^2}} + Ey^4 + Fy^6 + Gy^8 + Hy^{10} + \ldots$$

where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol r represents the radius of curvature of the vertex portion of the aspherical surface, reference symbol x represents the distance from an arbitrary point on the aspherical surface to the tangential plane which is tangential to the aspherical surface at the vertex thereof, reference symbol y represents the distance from said arbitrary point to the optical axis, and reference symbols $E, F, G, H, \ldots$ respectively represent coefficients of aspherical surface.

8. A large aperture ratio wide-angle photographic lens system according to claim 2 wherein said negative lens component located on the object side in said second lens group consists of a positive lens element and a negative lens element, and the surface on the image side of said negative lens component in said third lens group is formed as an aspherical surface expressed by the formula shown below, said large aperture ratio wide-angle photographic lens system having the following numerical data:

$r_1 = 242.7225$
$\quad d_1 = 10.7090 \quad n_1 = 1.62280 \quad \nu_1 = 57.06$
$r_2 = 95.0823$
$\quad d_2 = 44.6429$
$r_3 = 1269.4171$
$\quad d_3 = 25.0188 \quad n_2 = 1.62230 \quad \nu_2 = 53.20$
$r_4 = -272.5227$
$\quad d_4 = 9.2857$
$r_5 = 344.7205$
$\quad d_5 = 13.5714 \quad n_3 = 1.80518 \quad \nu_3 = 25.43$
$r_6 = -1839.8690$
$\quad d_6 = 3.5714$
$r_7 = -466.1647$
$\quad d_7 = 5.8929 \quad n_4 = 1.66998 \quad \nu_4 = 39.32$
$r_8 = 103.5518$
$\quad d_8 = 27.5433$
$r_9 = 92.8098$
$\quad d_9 = 26.2500 \quad n_5 = 1.81600 \quad \nu_5 = 46.62$
$r_{10} = -241.6409$
$\quad d_{10} = 0.5532$
$r_{11} = -735.4914$
$\quad d_{11} = 5.4714 \quad n_6 = 1.58904 \quad \nu_6 = 53.20$
$r_{12} = 129.7980$
$\quad d_{12} = 14.0029$
$r_{13} = \infty$ (stop)
$\quad d_{13} = 18.8214$
$r_{14} = -76.2543$
$\quad d_{14} = 8.2004 \quad n_7 = 1.50400 \quad \nu_7 = 52.00$
$r_{15} = -97.1871$ (aspherical surface)
$\quad d_{15} = 8.9286$
$r_{16} = -80.7619$
$\quad d_{16} = 5.6336 \quad n_8 = 1.84666 \quad \nu_8 = 23.88$
$r_{17} = 268.1878$
$\quad d_{17} = 26.1268 \quad n_9 = 1.77250 \quad \nu_9 = 49.66$
$r_{18} = -90.0288$
$\quad d_{18} = 0.3571$
$r_{19} = -15386.1909$
$\quad d_{19} = 18.6429 \quad n_{10} = 1.81600 \quad \nu_{10} = 46.62$
$r_{20} = -116.8505$
$f = 100, f_I = -1816.485, f_{In} = -258.177$
$f_{IIp} = 85.179, D = d_8 = 27.5433$
$E = 0.96182 \times 10^{-6}, F = 0.15558 \times 10^{-9}$
$G = 0.91534 \times 10^{-14}, H = 0.57286 \times 10^{-18}$
$\log|E| = -6.02$ $$x = \frac{\frac{y^2}{r}}{1 + \sqrt{1 - \left(\frac{y}{r}\right)^2}} + Ey^4 + Fy^6 + Gy^8 + Hy^{10} + \ldots$$

where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol r represents the radius of curvature of the vertex portion of the aspherical surface, reference symbol x represents the distance from an arbitrary point on the aspherical surface to the tangential plane which is tangential to the aspherical surface at the vertex thereof, reference symbol y represents the distance from said arbitrary point to the optical axis, and reference sybmols $E, F, G, H, \ldots$ respectively represent coefficients of aspherical surface.

9. A large aperture ratio wide-angle photographic lens system according to claim 3 wherein said negative lens component located on the object side in said second lens group consists of a positive lens element and a negative lens element, and the surface on the image side of said negative lens component in said third lens group is formed as an aspherical surface expressed by the formula shown below, said large aperture ratio wide-angle photographic lens system having the following numerical data:

$r_1 = 236.3516$
$\quad d_1 = 10.7087 \quad n_1 = 1.65830 \quad \nu_1 = 57.33$
$r_2 = 96.0618$
$\quad d_2 = 44.6414$
$r_3 = 1481.0757$
$\quad d_3 = 21.4279 \quad n_2 = 1.60311 \quad \nu_2 = 60.70$
$r_4 = -294.3310$
$\quad d_4 = 11.0711$
$r_5 = 295.2622$
$\quad d_5 = 13.5710 \quad n_3 = 1.80518 \quad \nu_3 = 25.43$
$r_6 = -1769.0704$
$\quad d_6 = 3.5713$
$r_7 = -612.1743$
$\quad d_7 = 5.8927 \quad n_4 = 1.66998 \quad \nu_4 = 39.32$
$r_8 = 97.1792$
$\quad d_8 = 27.5423$
$r_9 = 92.9771$
$\quad d_9 = 26.2492 \quad n_5 = 1.81600 \quad \nu_5 = 46.62$
$r_{10} = -255.1264$
$\quad d_{10} = 0.5532$
$r_{11} = -1723.6643$
$\quad d_{11} = 5.4713 \quad n_6 = 1.58904 \quad \nu_6 = 53.20$
$r_{12} = 126.1655$
$\quad d_{12} = 14.0024$
$r_{13} = \infty$ (stop)
$\quad d_{13} = 18.8208$
$r_{14} = -75.8547$
$\quad d_{14} = 7.8569 \quad n_7 = 1.50137 \quad \nu_7 = 56.40$
$r_{15} = -160.7198$
$\quad d_{15} = 1.0714 \quad n_8 = 1.49216 \quad \nu_8 = 57.50$
$r_{16} = -101.9118$ (aspherical surface)
$\quad d_{16} = 8.2140$
$r_{17} = -82.6970$
$\quad d_{17} = 5.3570 \quad n_9 = 1.84666 \quad \nu_9 = 23.88$
$r_{18} = 254.9063$
$\quad d_{18} = 27.1420 \quad n_{10} = 1.77250 \quad \nu_{10} = 49.66$
$r_{19} = -89.1108$
$\quad d_{19} = 0.3571$
$r_{20} = 3033.6362$
$\quad d_{20} = 17.8566 \quad n_{11} = 1.81600 \quad \nu_{11} = 46.62$ -continued $r_{21} = -125.5618$
$f = 100, f_I = -995.402, f_{In} = -253.526$
$f_{IIp} = 86.438, D = d_8 = 27.5423$
$E = 0.91718 \times 10^{-6}, F = 0.12071 \times 10^{-9}$
$G = 0.56621 \times 10^{-14}, H = 0.16151 \times 10^{-17}$
$\log|E| = -6.04$ $$x = \frac{\frac{y^2}{r}}{1 + \sqrt{1 - \left(\frac{y}{r}\right)^2}} + Ey^4 + Fy^6 + Gy^8 + Hy^{10} + \ldots$$

where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol r represents the radius of curvature of the vertex portion of the aspherical surface, reference symbol x represents the distance from an arbitrary point on the aspherical surface to the tangential plane which is tangential to the aspherical surface at the vertex thereof, reference symbol y represents the distance from said arbitrary point to the optical axis, and reference symbols E, F, G, H, $\ldots$ respectively represent coefficients of aspherical surface.

10. A large aperture ratio wide-angle photographic lens system according to claim 1 wherein said negative lens component located on the object side in said second lens group consists of a negative single lens, said positive lens component in said second lens group consists of two positive lens elements, and the surface on the image side of said negative lens component in said third lens group is formed as an aspherical surface expressed by the formula shown below, said large aperture ratio wide-angle photographic lens system having the following numerical data:

$r_1 = 141.0631$
  $d_1 = 8.8880$    $n_1 = 1.60311$    $\nu_1 = 60.70$
$r_2 = 75.3180$
  $d_2 = 45.6606$
$r_3 = -1379.1765$
  $d_3 = 14.3620$   $n_2 = 1.54771$    $\nu_2 = 62.83$
$r_4 = -219.4714$
  $d_4 = 3.5468$
$r_5 = 598.1856$
  $d_5 = 5.2636$    $n_3 = 1.58904$    $\nu_3 = 53.20$
$r_6 = 126.0424$
  $d_6 = 37.4837$
$r_7 = 96.5110$
  $d_7 = 11.1975$   $n_4 = 1.81600$    $\nu_4 = 46.62$
$r_8 = 144.3570$
  $d_8 = 7.5869$
$r_9 = 130.5190$
  $d_9 = 20.3422$   $n_5 = 1.81600$    $\nu_5 = 46.62$
$r_{10} = -206.9942$
  $d_{10} = 0.8684$
$r_{11} = -502.7700$
  $d_{11} = 5.0635$ $n_6 = 1.63854$    $\nu_6 = 55.38$
$r_{12} = 116.9654$
  $d_{12} = 11.6916$
$r_{13} = \infty$ (stop)
  $d_{13} = 17.5876$
$r_{14} = -72.6506$
  $d_{14} = 9.4994$ $n_7 = 1.51742$    $\nu_7 = 52.41$
$r_{15} = -90.6333$     (aspherical surface)
  $d_{15} = 10.2639$
$r_{16} = -69.3864$
  $d_{16} = 5.9412$ $n_8 = 1.84666$    $\nu_8 = 23.88$ -continued $r_{17} = 314.2332$
  $d_{17} = 25.2397$   $n_9 = 1.77250$    $\nu_9 = 49.66$
$r_{18} = -82.6406$
  $d_{18} = 0.3450$
$r_{19} = 2969.0568$
  $d_{19} = 16.9676$   $n_{10} = 1.81600$    $\nu_{10} = 46.62$
$r_{20} = -120.8530$
$f = 100, f_I = -941.954, f_{In} = -282.307$
$f_{IIp} = 82.453, D = d_6 = 37.4837$
$E = 0.90512 \times 10^{-6}, F = 0.31877 \times 10^{-9}$
$G = -0.13990 \times 10^{-12}, H = 0.49195 \times 10^{-16}$
$\log|E| = -6.04$ $$x = \frac{\frac{y^2}{r}}{1 + \sqrt{1 - \left(\frac{y}{r}\right)^2}} + Ey^4 + Fy^6 + Gy^8 + Hy^{10} + \ldots$$

where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol r represents the radius of curvature of the vertex portion of the aspherical surface, reference symbol x represents the distance from an arbitrary point on the aspherical surface to the tangential plane which is tangential to the aspherical surface at the vertex thereof, reference symbol y represents the distance from said arbitrary point to the optical axis, and reference symbols E, F, G, H, $\ldots$ respectively represent coefficients of aspherical surface.

11. A large aperture ratio wide-angle photographic lens system comprising, in the order from the object side, a first lens group comprising a negative lens component, a second lens group comprising a lens component, which comprises at least one negative lens element and has negative refractive power as a whole, a positive lens component and a negative lens component, and a negative lens component, and a third lens group comprising a negative lens component, a positive lens component arranged as a cemented doublet, which consists of a negative lens element and a positive lens element, and a positive lens component, said large aperture ratio wide-angle photographic lens system being arranged that a stop is located between said positive lens component in said second lens group and said third lens group and that an aspherical surface is provided near said stop, said aspherical surface being defined by the following formula, and said large aperture ratio wide-angle photographic lens system having an aperture ratio of about F/1.4 and being further arranged to fulfill the following conditions:

$$x = \frac{\frac{y^2}{r}}{1 + \sqrt{1 - \left(\frac{y}{r}\right)^2}} + Ey^4 + Fy^6 + Gy^8 + Hy^{10} + \ldots$$

$$0.79 \times 10^{-6} < |E| < 1.05 \times 10^{-6}$$

where, reference symbol r represents the radius of curvature of the vertex portion of the aspherical surface, reference symbol x represents the distance from an arbitrary point on the aspherical surface to the tangential plane which is tangential to the aspherical surface at the vertex thereof, reference symbol y represents the distance from said arbitrary point to the optical axis, and reference symbols E, F, G, H, respectively represent coefficients of aspherical surface and $$4.0 < |f_I/f| < 30, f_I < 0 \tag{1}$$

$$1.7 < |f_{In}/f| < 5.0, f_{In} < 0 \tag{2}$$

$$0.5 < f_{IIp}/f < 2.0 \tag{3}$$

$$0.2 < D/f < 0.7 \tag{4}$$

where, reference symbol f represents the focal length of the lens system as a whole, reference symbol $f_1$ represents the total focal length of the first lens group, reference symbol $f_{In}$ represents the focal length of the negative lens component in the first lens group, reference symbol $f_{IIp}$ represents the focal length of the positive lens component in the second lens group, and reference symbol D represents the airspace between the negative lens component arranged on the object side in the second lens group and the positive lens component in the second lens group.

* * * * *